US012505477B1

(12) United States Patent
Brossman et al.

(10) Patent No.: US 12,505,477 B1
(45) Date of Patent: Dec. 23, 2025

(54) OUTFIT RECOMMENDER SYSTEM

(71) Applicant: The RealReal, Inc., San Francisco, CA (US)

(72) Inventors: Christopher Brossman, Berkeley, CA (US); Dhaval Dholakia, Brighton, MA (US); Ryan Elizabeth Wolff, San Francisco, CA (US); Jennifer Esteche, Montevideo (UY); Lucas Micol, Carmelo (UY)

(73) Assignee: The RealReal, Inc., San Francisco, CA (US)

( * ) Notice: Subject to any disclaimer, the term of this patent is extended or adjusted under 35 U.S.C. 154(b) by 451 days.

(21) Appl. No.: 17/863,287

(22) Filed: Jul. 12, 2022

(51) Int. Cl.
G06Q 30/00 (2023.01)
G06Q 10/087 (2023.01)
G06Q 30/0601 (2023.01)

(52) U.S. Cl.
CPC ....... *G06Q 30/0631* (2013.01); *G06Q 10/087* (2013.01)

(58) Field of Classification Search
CPC .......................... G06Q 30/0631; G06Q 10/087
See application file for complete search history.

(56) References Cited

U.S. PATENT DOCUMENTS

| 11,100,560 | B2 | 8/2021 | Parker et al. |
| 2020/0257976 | A1 | 8/2020 | Polania Cabrera et al. |
| 2020/0372560 | A1* | 11/2020 | Dahl ...................... G06N 20/00 |

(Continued)

FOREIGN PATENT DOCUMENTS

| CN | 102968555 A | 3/2013 |
| KR | 20190056748 A | 5/2019 |

(Continued)

OTHER PUBLICATIONS

A. Ravi, S. Repakula, U. K. Dutta and M. Parmar, "Buy Me That Look: An Approach for Recommending Similar Fashion Products," 2021 IEEE 4th International Conference on Multimedia Information Processing and Retrieval (MIPR), Tokyo, Japan, 2021, pp. 97-103, doi: 10.1109/MIPR51284.2021.00022. (Year: 2021).*

*Primary Examiner* — Anand Loharikar
(74) *Attorney, Agent, or Firm* — Adibi IP Group, PC; Amir V. Adibi; Andrew C. Palmer

(57) ABSTRACT

An outfit recommender system includes an outfit recommender and a storage system. The storage system stores embedding information for available inventory and for preconfigured outfits. Available inventory changes dynamically as items are added or sold by a provider. Preconfigured items are grouped together to form outfits and are generated from any source regardless of whether such items are available or exist in the market. After a customer selects an item to view, a preconfigured item most visually similar to the selected item is obtained. The preconfigured item has associated preconfigured complementary items that together form the preconfigured outfit. Next, complementary items in available inventory most visually similar to the preconfigured complementary items are obtained and presented to the customer. The novel outfit recommender provides dynamic outfit recommendations that change as available inventory changes based on static, pre-curated outfits. Complementary items are optionally filtered based on filter and/or profile information.

14 Claims, 11 Drawing Sheets

OUTFIT RECOMMENDER SYSTEM

(56) References Cited

U.S. PATENT DOCUMENTS

2020/0394699 A1 12/2020 Mueller
2021/0166290 A1  6/2021 Di et al.
2021/0182934 A1  6/2021 Semarjian et al.

FOREIGN PATENT DOCUMENTS

KR      102282738 B1   7/2021
TW        M610867 U   4/2021
WO     2018078352 A2   5/2018
WO     2021071240 A1   4/2021

* cited by examiner

OUTFIT RECOMMENDER SYSTEM

EMBEDDINGS OF PRECONFIGURED ITEMS

EMBEDDINGS OF ITEMS IN AVAILABLE INVENTORY

OBTAIN ITEM IN PRECONFIGURED OUTFITS MOST VISUALLY SIMILAR TO THE SELECTED ITEM $$similarity = \cos(\theta) = \frac{A \cdot B}{||A|| \, ||B||} = \frac{\sum_{i=1}^{n} A_i B_i}{\sqrt{\sum_{i=1}^{n} A_i^2} \sqrt{\sum B_i^2}}$$

52

COSINE SIMILARITY COMPUTATION USED TO COMPUTE SIMILARITY BETWEEN EMBEDDINGS

OUTFIT RECOMMENDER

DATA STRUCTURES FOR AVAILABLE INVENTORY
AND PRECONFIGURED OUTFIT INFORMATION

ROUTING TABLE
58

| METHOD | PATH | TASK |
|---|---|---|
| GET | /PROD_ID/:ID | REQUEST COMPLEMENTARY ITEMS BASED ON PRODUCT ID |

⋮

FOR EXAMPLE

HTTPS://API.TRR.COM/PROD_ID/1111/

ROUTING TABLE
FIG. 10

OBTAINING COMPLEMENTARY ITEMS FROM DYNAMIC INVENTORY BASED ON PRECONFIGURED OUTFITS

FILTERING RECOMMENDED ITEMS

OUTFIT RECOMMENDER SYSTEM

TECHNICAL FIELD

The present invention relates generally to information filtering systems, and more specifically, to recommender systems.

BACKGROUND INFORMATION

Large retail providers often offer many types of items for sale and carry a significant variety of inventory. Retail providers typically sell items using online commerce platforms. These online commerce platforms provide customers with the functionality to purchase items from retailers through websites or through mobile applications. The customer accesses online commerce platforms via their desktop or mobile internet browsers or via a mobile application downloaded and installed on their mobile device. After selecting an item of interest to view, the customer is presented with a Product Description Page (PDP). The PDP provides the customer with information in connection with the selected item of interest, including price information and a description of the item. The customer is able to purchase the selected item via the PDP.

SUMMARY

An outfit recommender system includes an outfit recommender and a storage system. A provider entity, such as an online retailer, sells inventory via various sales channels, including online commerce platforms. The outfit recommender dynamically generates complementary item recommendations based on changing inventory and previously curated preconfigured outfits. The complementary items are generated by comparing visual similarities between preconfigured outfits and available inventory. The complementary items are presented on a PDP as suggestions to customers to purchase in addition to the selected item. As available inventory changes, recommended complementary items also change based on the static collection of preconfigured outfits. The preconfigured outfits may be added, removed, or updated as desired.

The storage system stores embedding information for available inventory and for preconfigured outfits. Embeddings are generated by supplying image data, such as an image file, to an embedding model. The embedding model receives the image data and generates a low-dimensional vector that represents the input image data. Additional information may be supplied to the embedding model and stored in the embedding. This additional information includes item description information, taxon information, price information, provider or source information, sale information, market characteristic information, filter information, or any other metadata associated with an item. The embeddings provide a technique for comparing visual similarities between the available inventory and items of the preconfigured outfits. In one embodiment, the embedding model involves one or more layers of a neural network, such as a convolutional neural network (CNN).

Available inventory changes dynamically as items are added or sold by a provider. As new items are added to inventory, new embeddings are generated and stored in the storage system. Preconfigured items are grouped together to form preconfigured outfits. The preconfigured items may remain static or may be added, updated, or removed. Even if the preconfigured items remain static, the outfit recommender will automatically generate new curated outfits as available inventory changes. The preconfigured items are generated from any source regardless of whether such items are available or exist in the market.

Conventional retailers generate curated outfits based on available items sold or available from the retailer. The novel outfit recommender system, on the other hand, provides outfit curators with unlimited flexibility in configuring outfits. In curating outfits, curators are able to select items from any designer or generate new items that do not exist or are not commercially available. This novel functionality affords curators complete creative control without limiting them to current or future inventory. The preconfigured outfits are generated from any source regardless of whether such items are available or exist in the marketplace.

In operation, a customer accesses items provided by a provider entity via an online commerce platform. When a customer selects an item to view, a request is generated and supplied to the outfit recommender that includes an identifier (ID) for the selected item. Next, an embedding for the selected item is obtained. In one example, the embedding for the selected item is retrieved from the storage system. In another example, the embedding for the selected item is generated on the fly in response to the request. Next, a preconfigured item most visually similar to the selected item is identified. In one example, the embedding of the selected item is compared via cosine similarity to each embedding of the preconfigured items belonging to the same taxon as the selected item. The matching preconfigured item that is most similar to the selected item has corresponding preconfigured complementary items that together form the preconfigured outfit. Next, complementary items most visually similar to the preconfigured complementary items are obtained. In one example, each embedding of the preconfigured complementary items is compared via cosine similarity to each embedding of the available items of the same taxon. This yields the most visually similar complementary items in available inventory that complement the selected item. Next, the complementary items are presented to the customer on a PDP along with the selected item.

Complementary items are optionally filtered based on filter and/or profile information. In one embodiment, the filter information and the profile information are generated via user input. For example, the customer might indicate their price or designer preferences in the online commerce platform. In another embodiment, the filter information and the profile information are generated by tracking user activity and by taking into consideration micro or macro customer behavior, consumer trends, price data, provider or source data, sales data, market trends, or other information usable to drive sales. In still other embodiments, the filter information and the profile information are generated from a combination of user input and other collected information.

The novel outfit recommender provides dynamic outfit recommendations based on static, pre-curated outfits that change as available inventory changes. In the case of a single stock-keeping unit (SKU) provider, such as an online consignment entity that might only carry one of an item rather than many, many quantities of any given item, the novel outfit recommender yields significant technical advancements. The single SKU provider does not have to spend resources on crafting curated outfits based on available inventory. Rather, once a quantity of pre-curated outfits have been generated, the single SKU provider is able to provide dynamic creation of recommended complementary outfits as available inventory changes. As new items are added to or removed from available inventory, complementary item recommendations will automatically adapt and change without any further user input. This is a significant advancement in online retail in which conventional retailers conventionally rely upon known inventory to generate curated outfit recommendations.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 10 is a detailed diagram of a routing table 58.

DETAILED DESCRIPTION

Reference will now be made in detail to some embodiments of the invention, examples of which are illustrated in the accompanying drawings.

Figure 1:
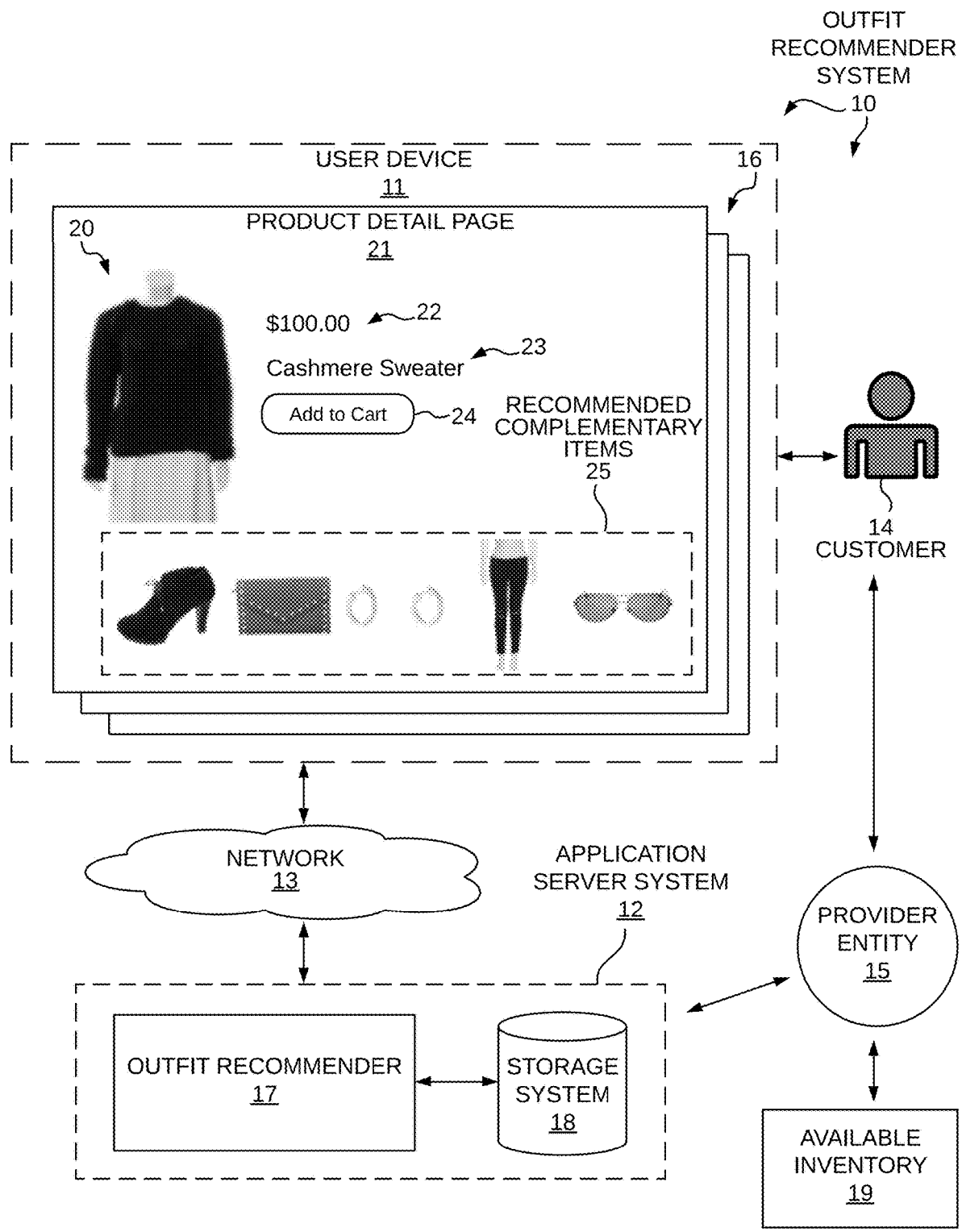
FIG. 1 is a diagram of an outfit recommender system 10 in accordance with one embodiment.

FIG. 1 is a diagram of an outfit recommender system 10 in accordance with one embodiment. The outfit recommender system 10 includes a user device 11 and an application server system 12. The user device 11 communicates with the application server system 12 over a network 13. The application server system 12 provides an electronic commerce platform that allows a customer 14 to view and purchase items provided by a provider entity 15. The user device 11 is a mobile device, tablet, desktop computer, VR/AR headset, virtual assistant device, or any other network-enabled device suitable to access the electronic commerce platform. The provider entity 15 is an entity that manages and sells inventory, such as an online retailer or online consignor. The customer 14 views one or more items presented on product detail pages 16 via the user device 11. The product detail pages 16 are presented via a mobile application or internet browser operating on the user device 11.

The application server system 12 comprises an outfit recommender 17 and a storage system 18. The application server system 12 includes additional components and hardware (not shown) that provide product detail pages 16 and allow provider entity 15 to manage inventory 19 and other functionality associated with offering items for sale. In one embodiment, the outfit recommender 17 and the storage system 18 operate across a distributed network. For example, the outfit recommender 17 is realized as a Compute Engine virtual machine operating on Google Cloud infrastructure and the storage system 18 is realized as an Elasticsearch Service operating on the Google Cloud infrastructure.

In operation, the customer 14 selects an item of interest to view. The selected item is presented on a product detail page (PDP) 21. The PDP 21 presents an image of the selected item 20, price information 22, a description 23, a purchasing user interface element 24, and recommended complementary items 25. In this example, the selected item 20 is a "Cashmere Sweater" that costs "$100.00" and is available for purchase via the "Add to Cart" button 24 presented on the PDP 21. After purchase is completed, the provider entity 15 ships the physical item represented by selected item 20 to the customer 14 and the storage system 18 is updated to reflect the change in available inventory.

In accordance with at least one novel aspect, the recommended complementary items 25 are dynamically generated by the outfit recommender 17 from available inventory 19 based on previously curated preconfigured outfits. The preconfigured outfits need not be arranged based on available, known, or prior existing inventory. The complementary items 25 are generated dynamically by comparing visual similarities between preconfigured outfits and available inventory. The complementary items 25 are presented on the PDP 21 as suggestions to customer 14 to purchase in addition to the selected item 20. The selected item 20 and the recommended complementary items 25 provide a dynamically curated outfit recommendation provided by the provider entity 15 that changes without user input as available inventory changes. As available inventory changes, recommended complementary items will also change based on the static collection of preconfigured outfits. The preconfigured outfits may be added, removed, or updated as desired.

Figure 2:
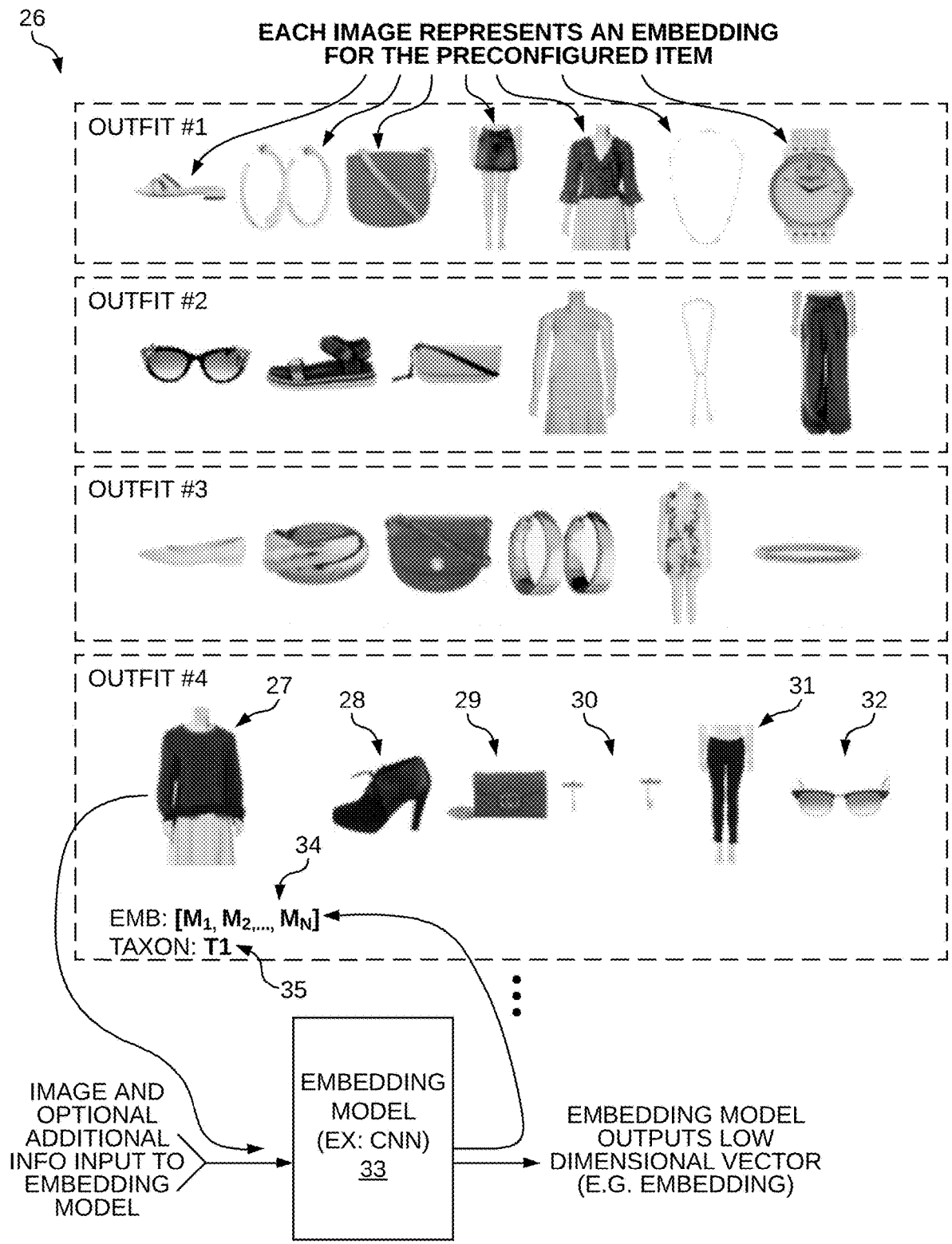
FIG. 2 is a diagram showing how embeddings 26 for items of preconfigured outfits are generated and stored in storage system 18.

FIG. 2 is a diagram showing how embeddings 26 for items of preconfigured outfits are generated and stored in storage system 18. Each preconfigured outfit includes a plurality of items. An item in a preconfigured outfit is referred to as a "preconfigured item" and other items in the preconfigured outfit are referred to as "preconfigured complementary items". Four preconfigured outfits (#1-#4) are shown in FIG. 2, however, many more preconfigured outfits are optionally generated and stored in the storage system 18. Each of the preconfigured outfits #1-#4 includes image data corresponding to items that are deemed by a curator to form a desirable outfit. For example, outfit #4 includes image data 27 corresponding to a sweater, image data 28 corresponding to shoes, image data 29 corresponding to a purse, image data 30 corresponding to earrings, image data 31 corresponding to jeans, and image data 32 corresponding to sunglasses.

Each image shown in FIG. 2 represents an embedding generated using an embedding model 33. The embedding model 33 receives image data and any additional information and generates a low-dimensional vector. The low-dimensional vector output by the embedding model 33 represents the input image data and any additional input information. Additional information includes item description information, taxon information, price information, provider or source information, sale information, market characteristic information, filter information, or any other metadata associated with an item.

In the example of FIG. 2, outfit #4 includes the image data 27 corresponding to a sweater. The image data 27 is supplied to an embedding model 33 in addition to optional additional information. The additional information used to generate the embedding 34 might include description information, taxon information, price information, brand or designer information, or sales history of the item. The embedding model 33 generates and outputs an embedding 34 from the image data 27 and optional additional information. In one example, taxon information 35 ("T1") is also represented in the embedding 34. The embedding 34 is represented by a one-dimensional array $[M_1, M_2, \ldots M_N]$. For each item of the preconfigured outfits, an embedding is generated and stored in the storage system 18.

In accordance with at least one novel aspect, the novel outfit recommender system 10 provides functionality that allows for curators and retailers to generate preconfigured outfits that are used by the outfit recommender 17 to dynamically generate visually similar outfits based on unknown or constantly changing available inventory. Conventional retailers generate curated outfits based on available items sold or available from the retailer. On the other hand, novel system 10 provides outfit curators with unlimited flexibility in configuring outfits. In curating outfits, curators are able to select items from any designer or generate new items that do not exist or are not commercially available. This novel functionality provided by the outfit recommender system 10 is advantageous because it affords curators complete creative control without limiting them to current or future inventory. Rather, the preconfigured outfits are generated from any source regardless of whether such items are available or exist in the marketplace.

Figure 3:
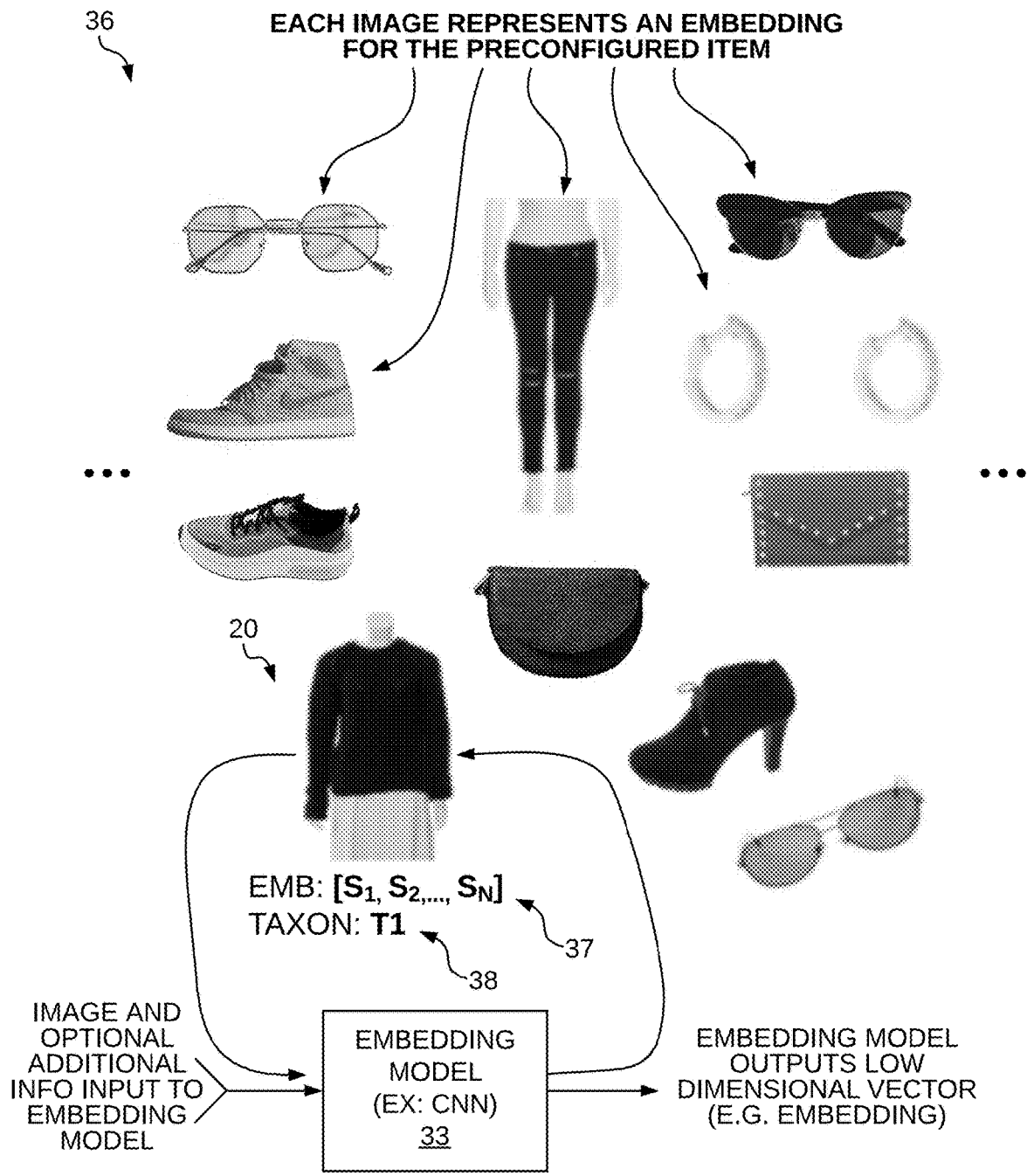
FIG. 3 is a diagram showing how embeddings 36 for items in available inventory 19 are generated and stored in storage system 18.

FIG. 3 is a diagram showing how embeddings 36 for items in available inventory 19 are generated and stored in storage system 18. Each item in available inventory 19 is stored as an embedding in the storage system 18. For example, image data 20 corresponds to the sweater selected by the customer 14 and presented on PDP 21 of FIG. 1. Items in available inventory 19 change dynamically throughout sales cycles. As items are sold or added, available inventory 19 is updated accordingly. As such, embeddings stored in the storage system 18 in connection with available inventory 19 are continuously added, updated, or removed over time.

Each image shown in FIG. 3 represents an embedding generated using an embedding model. For example, embedding 37 is shown directly below image data 20 for the selected item. The embedding model 33 receives image data and any additional information and generates a low-dimensional vector. The low-dimensional vector output by the embedding model 33 represents the input image data and any additional input information. Additional information includes item description information, taxon information, price information, provider or source information, sale information, market characteristic information, filter information, or any other metadata associated with an item.

In the example of FIG. 3, the image data 20 is supplied to the embedding model 33 in addition to optional additional information. The additional information used to generate the embedding 37 might include description information, taxon information, price information, brand or designer information, or sales history of the item. The embedding model 33 generates and outputs an embedding 37 from the image data 20 and optional additional information. In one example, taxon information 38 ("T1") is also represented in the embedding 37. The embedding 37 is represented by a one-dimensional array $[S_1, S_2, \ldots S_N]$. For each item in inventory 19, an embedding is generated and stored in the storage system 18.

Figure 4:
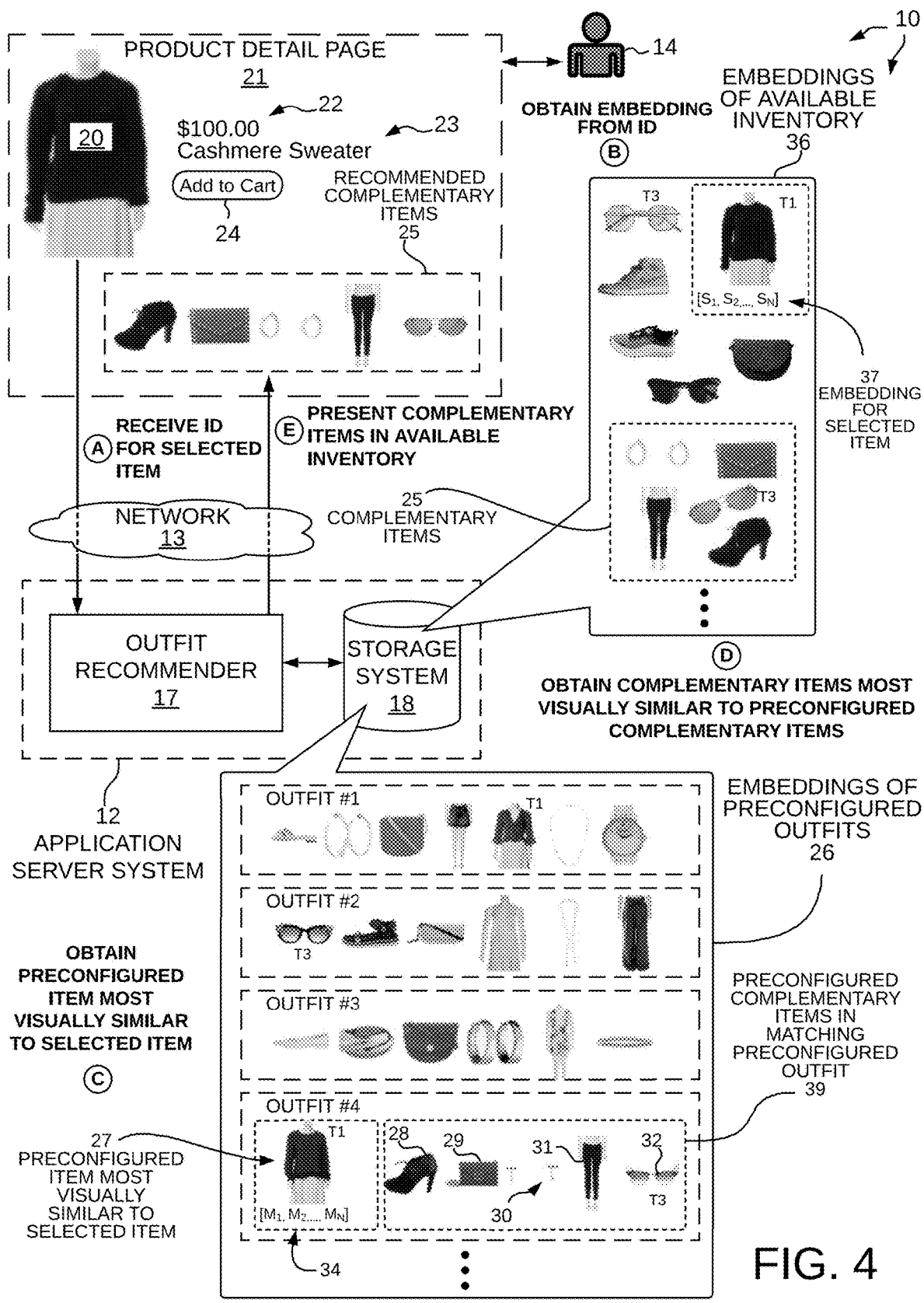
FIG. 4 is a diagram that shows operation of the outfit recommender system 10.

FIG. 4 is a diagram that shows operation of the outfit recommender system 10. A customer 14 accesses an electronic commerce platform associated with the provider entity 15. In this example, the electronic commerce platform is an online website or mobile application that communicates with the application server system 12 over the network 13 and is accessed via the user device 11. The user device 11 is not shown in FIG. 4. The online website or mobile application associated with the electronic commerce platform includes various product detail pages 16 allowing the customer 14 to view and purchase any items of interest. In this example, the customer 14 selects to view the image for a selected item 20. The outfit recommender 17 receives the request and performs various novel steps (labeled "A" through "E") to render a PDP 21 showing the image of the selected item 20 along with recommended complementary items 25.

First, an identifier ("ID") associated with selected item 20 is received onto the outfit recommender 17 (labeled as "A"). The identifier is a unique key that is used to identify and track items internally within the application server system 12. The identifier is also referred to as a "product ID", "item ID", or "ID" depending on the implementation. In this example, the identifier is received onto the outfit recommender 17 as a HTTP GET request in response to the customer 14 selecting to view selected item 20.

Next, an embedding associated with the selected item 20 is obtained (labeled as "B"). Each embedding is a low-dimensional vector that is generated using an embedding model. The embedding model reduces dimensionality of image data and any other input data associated with the item. The embedding represents image information, taxon, price, designer or source information associated with the item, description or characteristic information of the item, sale information, market characteristics associated with the item (e.g. time on marketplace or supply-chain information), filter information (e.g. customer profile characteristics), or other information useful in grouping or classifying items.

In one embodiment, embeddings 36 for each item in available inventory 19 are generated beforehand and are stored in the storage system 18 as explained in connection with FIG. 3. Each image of available inventory 19 shown in FIG. 4 represents an embedding. The storage system 18 need not store actual images. Instead, the images represent data embeddings and are only shown throughout the diagrams for purposes of easing explanation. The embedding for an item is accessed using the ID for the item. In this example, embedding 37 for selected item 20 is stored in the storage system 18. In another embodiment, embeddings for each item in available inventory 19 are generated dynamically rather than being generated and stored before the request.

Next, a preconfigured item most visually similar to the selected item 20 is obtained (labeled as "C"). The preconfigured item has associated preconfigured complementary items that together form a preconfigured outfit. Embeddings 26 for preconfigured outfits are stored in the storage system 18. Each image of the preconfigured outfits shown in FIG. 2 represents an embedding. Each embedding is grouped together with other embeddings that together form a preconfigured outfit. In this example, the preconfigured item 27 is determined to be most visually similar to the selected item 20.

In this embodiment, visual comparison is performed by computing cosine similarity values between the embedding 37 of the selected item 20 to each embedding 26 of the preconfigured outfits having the same taxon as the selected item 20. The cosine similarity values are sorted and ranked to obtain a most visually similar item. In the instant example, the selected item 20 is a taxon of type "sweater" labeled "T1". As such, the embedding 37 of the selected item 20 is compared to embeddings 26 in the preconfigured outfits also having the taxon of type "sweater" labeled "T1". This reduces the number of comparison operations that must be performed and improves operation and efficiency of system 10. The embedding 34 of preconfigured item 27 is determined to have the greatest cosine similarity value in this example. The embeddings 39 of preconfigured complementary items of matching outfit #4 will be used in generating the recommended complementary items.

Next, complementary items in available inventory most visually similar to the preconfigured complementary items are obtained (labeled as "D"). In this example, each embedding 39 of the preconfigured complementary items is compared via cosine similarity to embeddings 36 of available inventory having the same taxon. Computed cosine similarity values are ranked and sorted to obtain a most visually similar complementary item available in inventory 19. This process is performed for each preconfigured complementary item in the matching outfit. For example, an embedding 32 for sunglasses in matching outfit #4 is compared to each embedding in available inventory 19 having a taxon of type "sunglasses" labeled as "T3". This process is repeated for each of the remaining preconfigured complementary items 28-31 until the most visually similar complementary items in available inventory 19 are identified.

Next, the identified complementary items are presented to the customer along with the selected item 20 (labeled as "E"). In this example, the selected item 20 is presented to the customer 14 on the PDP 21 along with the images of recommended complementary items 25. Customer 14 is able to view PDPs for each complementary item 25 to view additional information, purchase the item, or view other complementary items on the respective PDP for the complementary item of interest. Upon selecting a complementary item, a PDP is presented along with new complementary items identified via the novel process described in the present disclosure.

Figure 5:
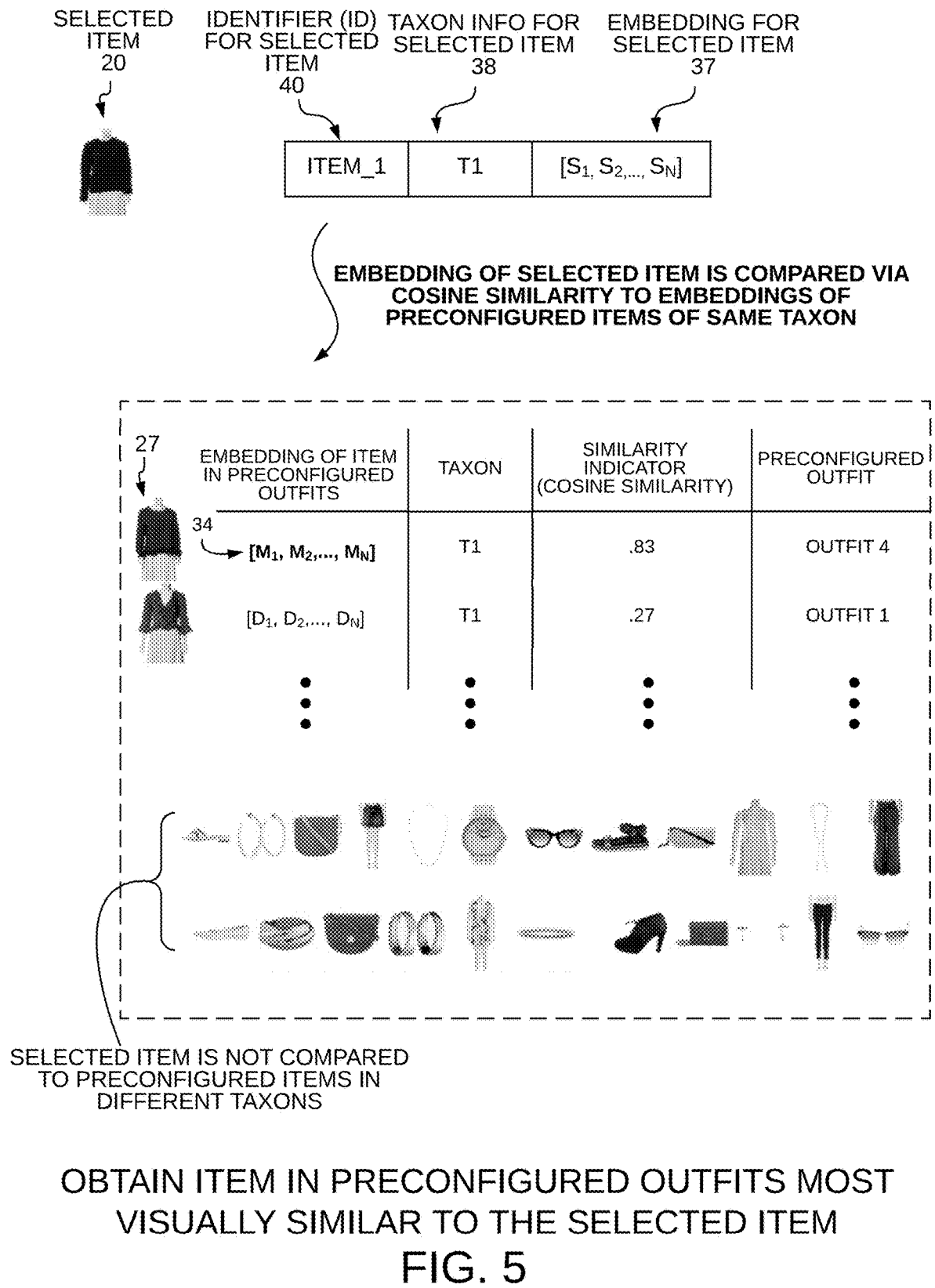
FIG. 5 is a diagram showing how outfit recommender 17 identifies an item of the preconfigured outfits most visually similar to a selected item 20.

FIG. 5 is a diagram showing how the outfit recommender 17 identifies an item of the preconfigured outfits most visually similar to the image of the selected item 20. The selected item 20 has a unique identifier ("ITEM_1" ID) 40, taxon information 38 ("T1" identifies "sweaters"), and embedding 37 ($[S_1, S_2, \ldots S_N]$). The embedding 37 for the selected item 20 is compared to each embedding 26 of the preconfigured outfits of the same taxon to obtain a most visually similar preconfigured item of the preconfigured outfits. In this embodiment, embeddings are compared to each other via cosine similarity. The cosine similarity values are ranked and sorted. The largest cosine similarity value indicates the most visually similar preconfigured item. In this example, embedding 34 corresponding to preconfigured item 27 of outfit #4 yields the greatest cosine similarity value of "0.83", indicating that preconfigured item 27 is the most visually similar to selected item 20. Preconfigured items of different taxons are not compared to the selected item 20, thereby reducing utilization of computational resources and increasing operating speed. In other embodiments, techniques other than cosine similarity are used to compare image or embedding data to identify most visually similar items.

Figure 6:
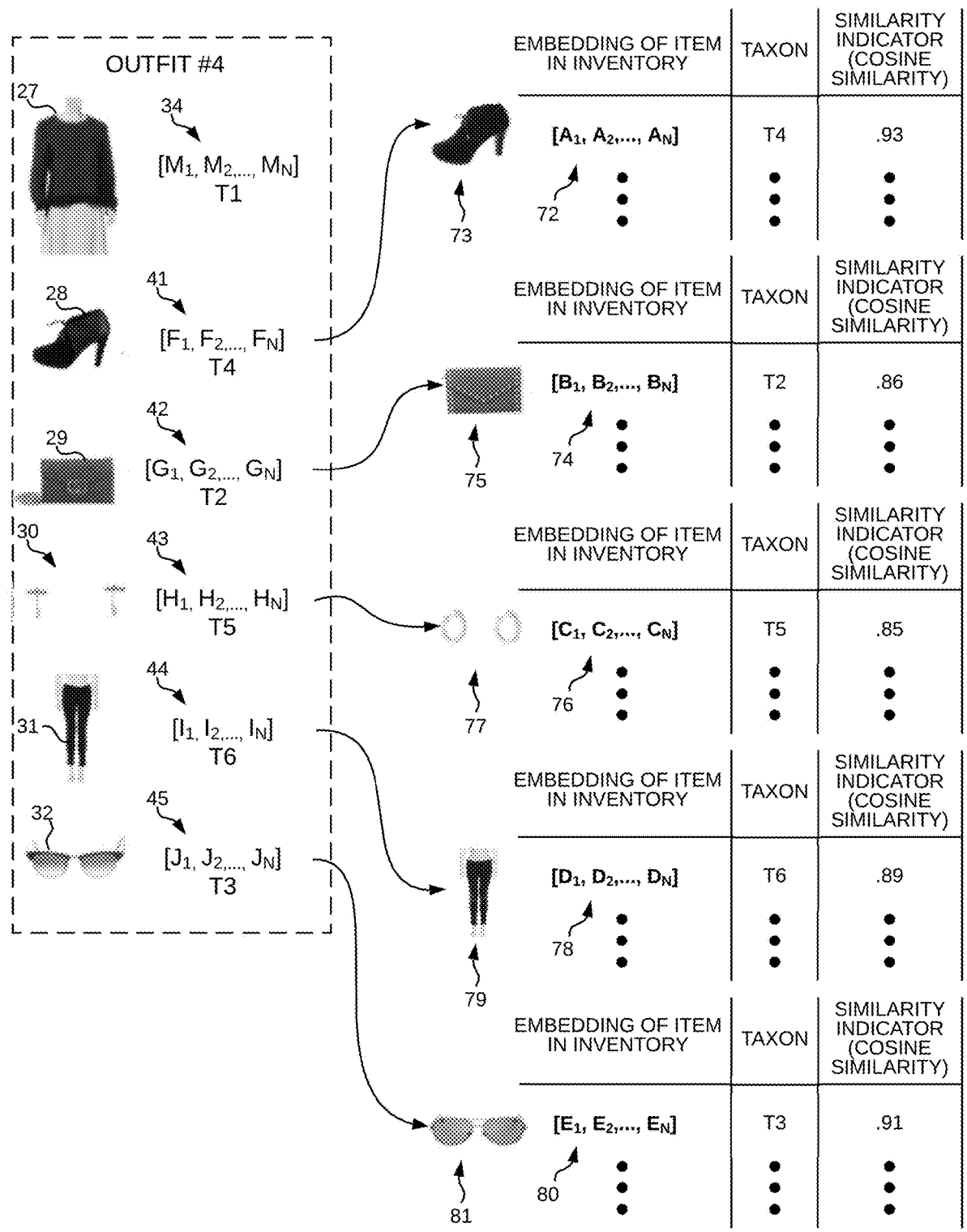
FIG. 6 is a diagram showing how outfit recommender 17 identifies complementary items in available inventory 19 most visually similar to preconfigured complementary items 39.

FIG. 6 is a diagram showing how the outfit recommender 17 identifies complementary items in available inventory 19 most visually similar to preconfigured complementary items 39. After determining that preconfigured item 27 is the most visually similar item in the preconfigured outfits to selected item 20, each of the preconfigured complementary items 39 associated with the preconfigured item 27 in outfit #4 is used to obtain complementary items in available inventory that complement the selected item 20. The visual comparison for each preconfigured complementary item is shown in FIG. 6 and described below.

Embedding 41 corresponding to preconfigured complementary item 28 ("shoes") of outfit #4 is compared to each embedding 36 of available inventory 19 having the same taxon ("T4"). Embedding 72 corresponding to item 73 yields the greatest cosine similarity value of "0.93" as compared to other cosine similarity computations for other available items of the same taxon ("T4"). This indicates that item 73 in available inventory 19 is the most visually similar to preconfigured complementary item 28.

Embedding 42 corresponding to preconfigured complementary item 29 ("bag") of outfit #4 is compared to each embedding 36 of available inventory 19 having the same taxon ("T2"). Embedding 74 corresponding to item 75 yields the greatest cosine similarity value of "0.86" as compared to other cosine similarity computations for other available items of the same taxon ("T2"). This indicates that item 75 in available inventory 19 is the most visually similar to preconfigured complementary item 29.

Embedding 43 corresponding to preconfigured complementary item 30 ("earrings") of outfit #4 is compared to each embedding 36 of available inventory 19 having the same taxon ("T5"). Embedding 76 corresponding to item 77 yields the greatest cosine similarity value of "0.85" as compared to other cosine similarity computations for other available items of the same taxon ("T5"). This indicates that item 77 in available inventory 19 is the most visually similar to preconfigured complementary item 30.

Embedding 44 corresponding to preconfigured complementary item 31 ("pants") of outfit #4 is compared to each embedding 36 of available inventory 19 having the same taxon ("T6"). Embedding 78 corresponding to item 79 yields the greatest cosine similarity value of "0.89" as compared to other cosine similarity computations for other available items of the same taxon ("T6"). This indicates that item 79 in available inventory 19 is the most visually similar to preconfigured complementary item 31.

Embedding 45 corresponding to preconfigured complementary item 32 ("sunglasses") of outfit #4 is compared to each embedding 36 of available inventory 19 having the same taxon ("T3"). Embedding 80 corresponding to item 81 yields the greatest cosine similarity value of "0.91" as compared to other cosine similarity computations for other available items of the same taxon ("T3"). This indicates that item 81 in available inventory 19 is the most visually similar to preconfigured complementary item 32. Complementary items 73, 75, 77, 79, and 81 are presented to the customer 14 as available complementary items on the PDP 21.

Figures 7, 8:
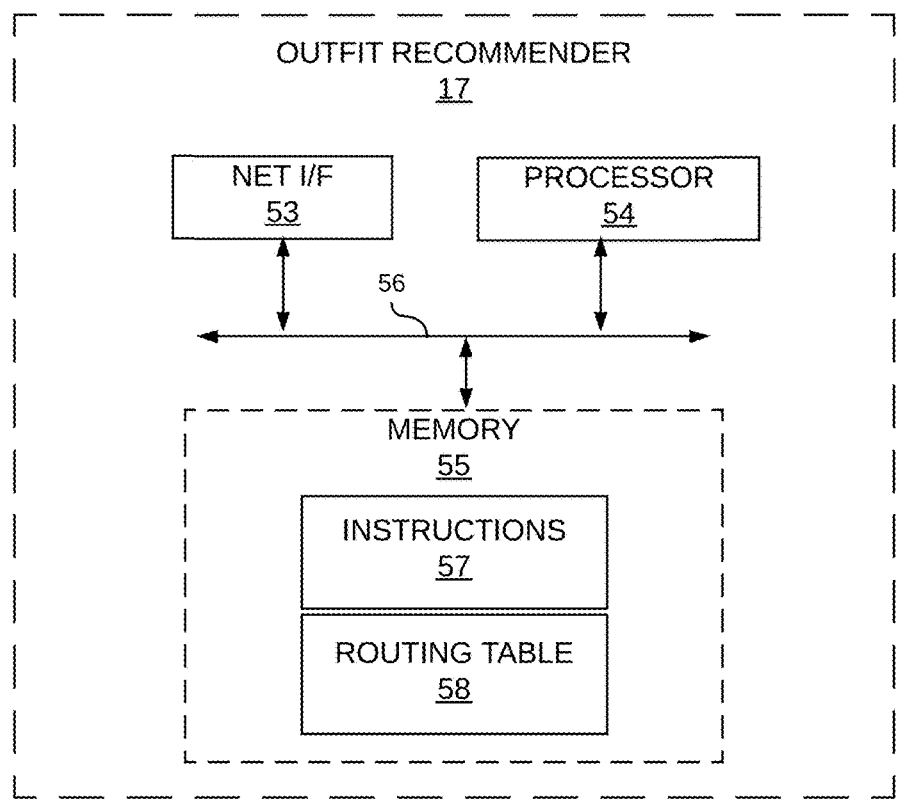
FIG. 7 is an equation 52 for computing cosine similarity between two embeddings.
FIG. 8 is a detailed diagram of the outfit recommender 17.

FIG. 7 is an equation 52 for computing cosine similarity between two embeddings. Equation 52 measures the similarity between two vectors. Embeddings are compared to each other using equation 52. In equation 52, "A" represents a first embedding and "B" represents a second embedding.

The resulting computation of equation 52 indicates how similar two embeddings are to each other. It is appreciated that cosine similarity is but one technique for comparing similarity between two embeddings and that other embodiments use different techniques to compare embeddings.

FIG. 8 is a detailed diagram of the outfit recommender 17. The outfit recommender 17 includes a network interface 53, a processor 54, a memory 55, and a communication link or bus 56. The memory 55 includes an amount of computer readable instructions 57 and a routing table 58. The instructions 57 perform the novel method to obtain complementary items from dynamically changing available inventory based on preconfigured outfits. The routing table 58 is used to receive and process representational state transfer application programming interface (REST API) requests received over a network. In one embodiment, various components of the outfit recommender 17 are realized as cloud computing resources, such as Google® Cloud Platform (GCP), Amazon® Web Services (AWS), or Microsoft® Azure, that operate over a distributed network.

Figure 9:
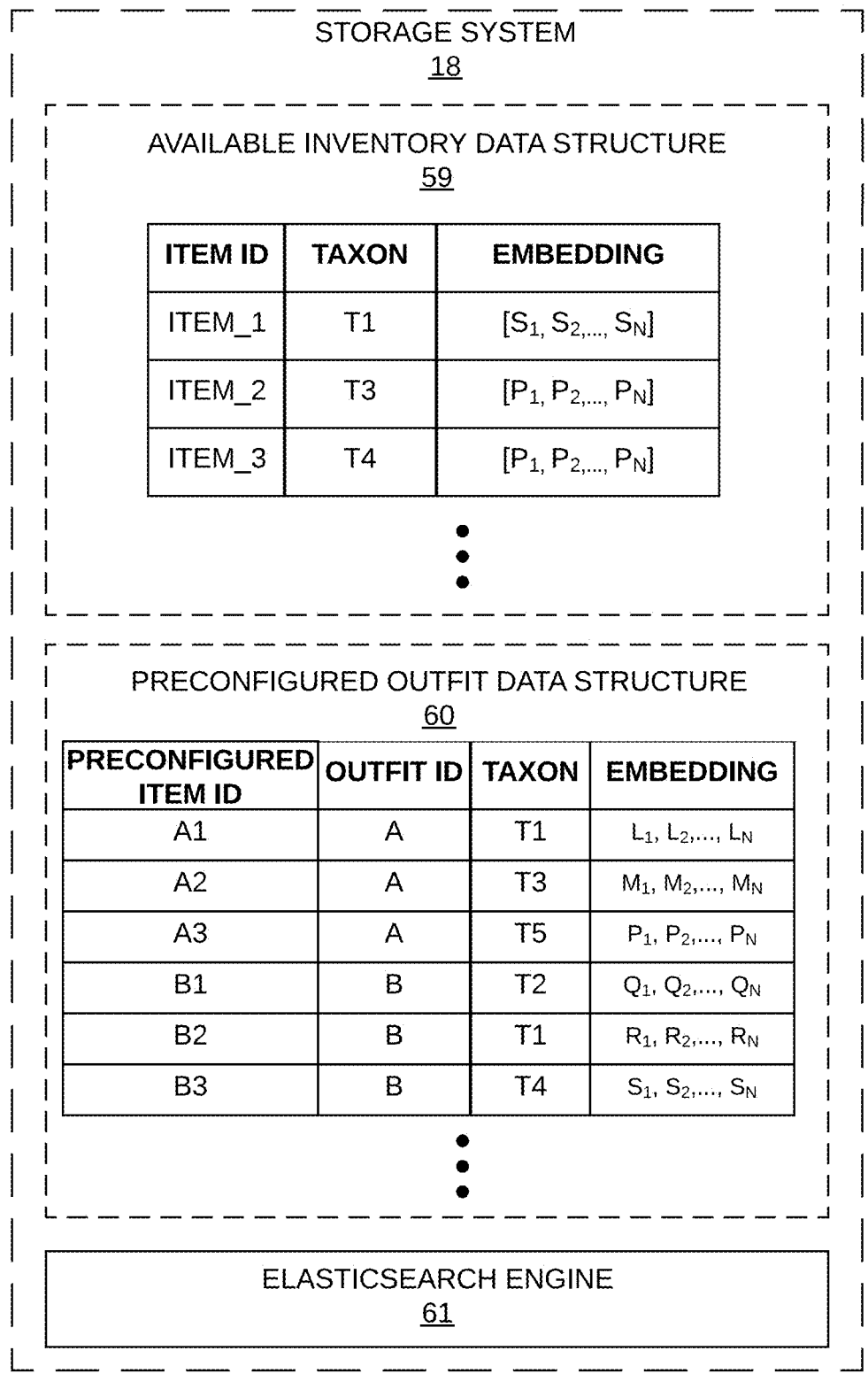
FIG. 9 is a detailed diagram of storage system 18.

FIG. 9 is a detailed diagram of storage system 18. The storage system 18 comprises an available inventory data structure 59, a preconfigured outfit data structure 60, and an elasticsearch engine 61. The available inventory data structure 59 stores information for available inventory including an item identifier (ID), taxon information, and embedding information for each item. Data in the available inventory data structure 59 changes dynamically as items are sold or added to inventory 19. The preconfigured outfit data structure 60 stores information for preconfigured outfits including a preconfigured item identifier (ID), an outfit identifier (ID), taxon information, and embedding information for each preconfigured item. The preconfigured outfit data structure 60 tends to remain static but can be modified to add new outfit configurations or to remove or modify existing outfits. The elasticsearch engine 61 provides an API accessible by the outfit recommender 17 to obtain and compare embeddings for items in available inventory and preconfigured outfits. The elasticsearch engine 61 is a distributed, RESTful search and analytics engine available from elastic.co/elasticsearch.

FIG. 10 is a detailed diagram of a routing table 58. The routing table 58 indicates how REST API requests are to be handled by the outfit recommender 17. The routing table 58 shown in FIG. 10 includes one entry for an HTTP (HyperText Transfer Protocol) GET request. When a product ID is received onto the outfit recommender 17 via an HTTP GET request, the outfit recommender 17 processes the request and returns complementary items via the novel process.

Figure 11:
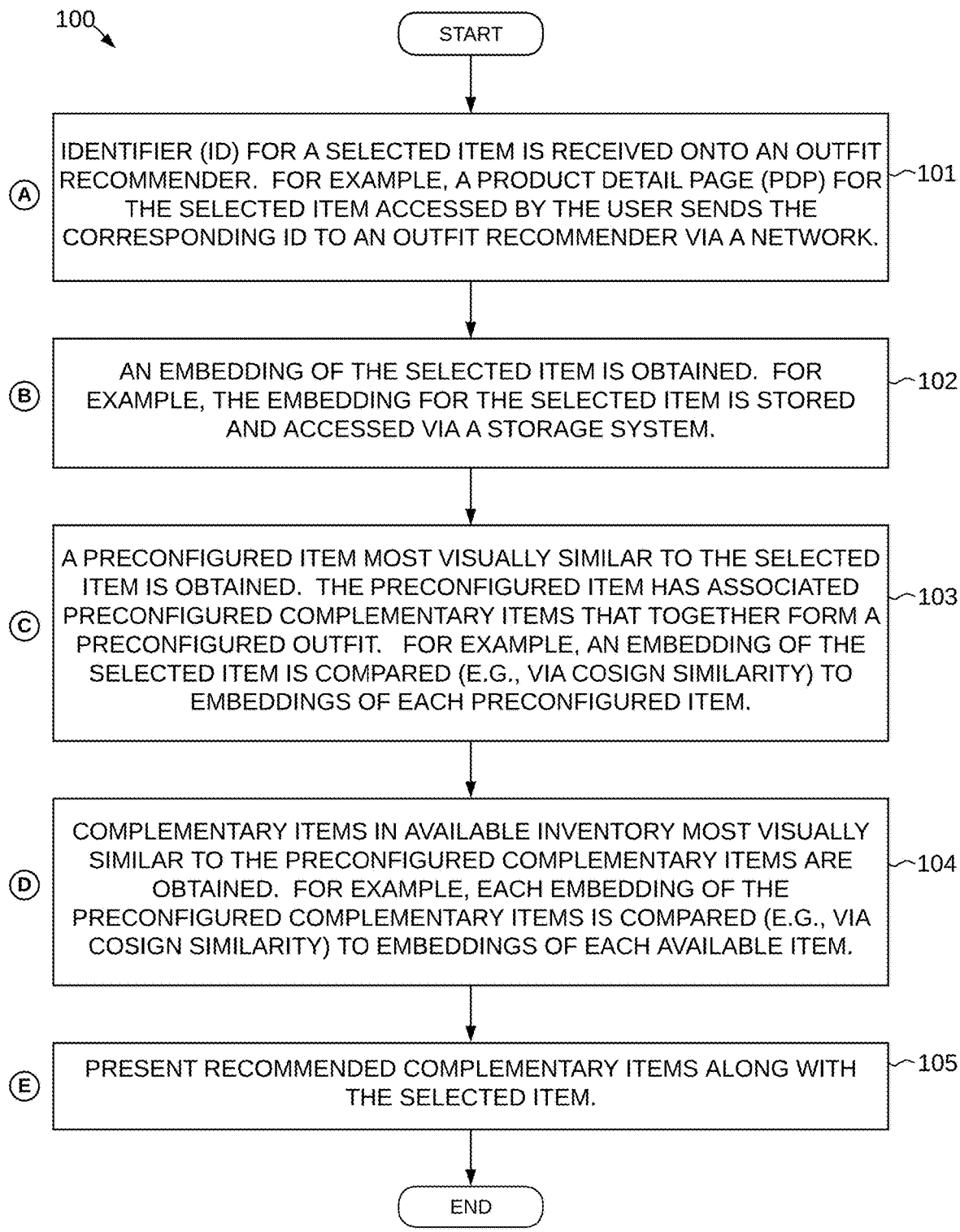
FIG. 11 is a flowchart of a method 100 in accordance with at least one novel aspect.

FIG. 11 is a flowchart of a method 100 in accordance with at least one novel aspect. In a first step (step 101), an identifier (ID) for a selected item is received onto an outfit recommender. For example, in FIG. 2, the PDP 21 for the selected item 20 accessed by the customer 14 sends the corresponding ID to an outfit recommender 17 via a network 13.

In a second step (step 102), an embedding of the selected item is obtained. For example, in FIG. 4, the embedding 26 for the selected item 20 is stored and accessed via a storage system 18.

In a third step (step 103), a preconfigured item most visually similar to the selected item is obtained. The preconfigured item has associated preconfigured complementary items that, together, form a preconfigured outfit. For example, in FIG. 4, an embedding 26 of the selected item 20 is compared (e.g., via cosine similarity) to embeddings of each preconfigured item.

In a fourth step (step 104), complementary items in available inventory most visually similar to the preconfigured complementary items are obtained. For example, in FIG. 4, each embedding 29 of the preconfigured complementary items is compared (e.g., via cosine similarity) to embeddings of each available item.

In a fifth step (step 105), the recommended complementary items 25 are presented along with the selected item 20. For example, in FIG. 4, recommended complementary items 25 are presented on the PDP 21 to customer 14.

Figure 12:
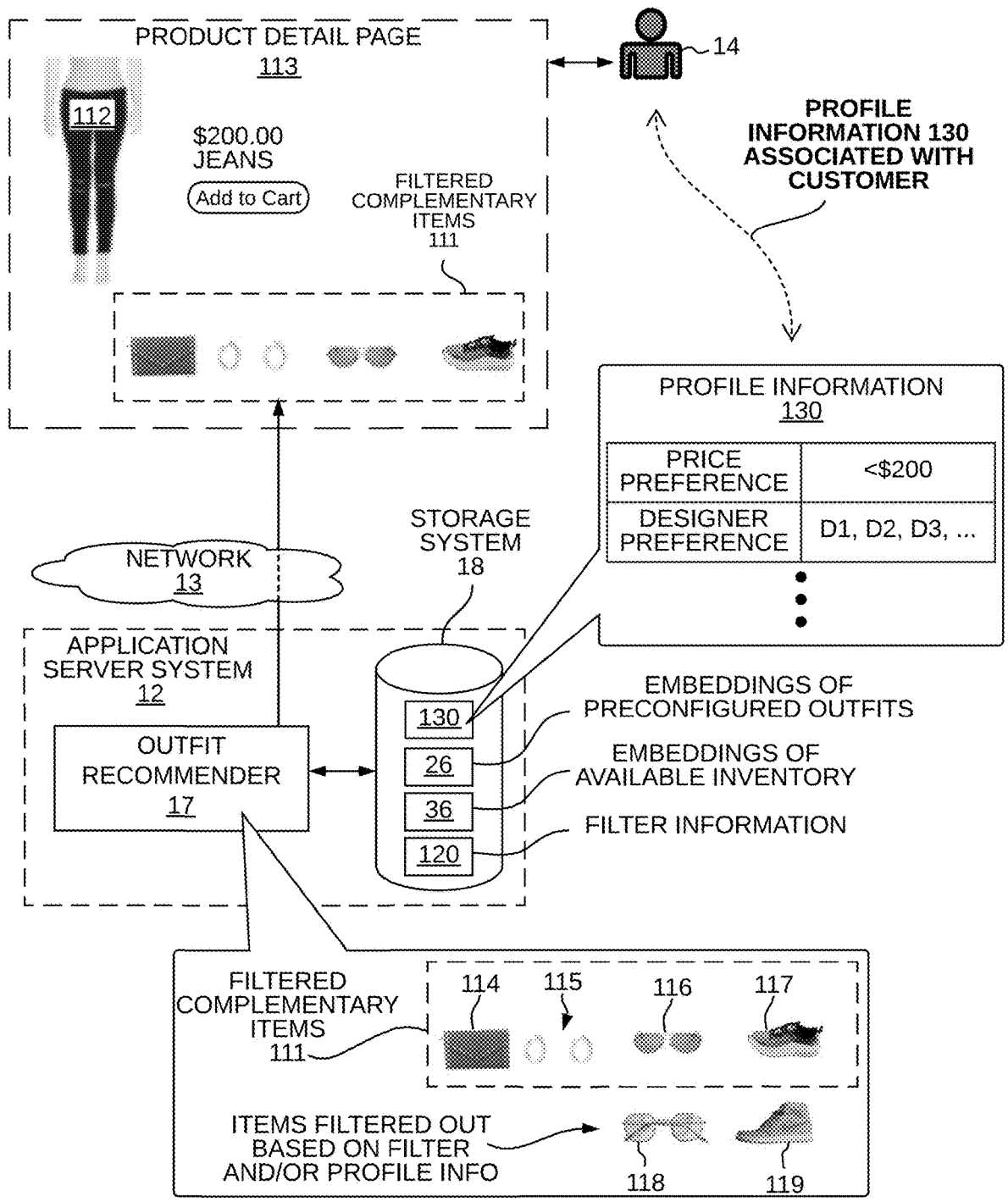
FIG. 12 is a diagram showing how recommended complementary items are optionally filtered based on filter information 120 and profile information 130.

FIG. 12 is a diagram showing how recommended complementary items are optionally filtered based on filter information 120 and profile information 130. In one embodiment, the storage system 18 stores filter information 120 and profile information 130 in addition to the embedding information 26 of preconfigured outfits and embedding information 36 of available inventory 19. The filter information 120 and profile information 130 are used by the outfit recommender 17 to determine items to include or exclude from the filtered complementary items 111. The filter information 120 is generated by analyzing individual customer behavior, consumer trends, price data, provider or source data, sales data, market trends, or other information usable to drive sales. The profile information 130 is generated by the outfit recommender 17, by customer input, or by a combination of both. For example, a customer may optionally select to view complementary items within a certain price range or by certain designers.

After customer 14 selects to view details for selected item 112, PDP 113 is presented showing information in connection with selected item 112 and recommended complementary items 111. The recommended complementary items 111 presented to customer 14 include items 114 ("purse"), 115 ("earrings"), 116 ("sunglasses"), and 117 ("shoes"). Items 118 ("sunglasses") and 119 ("shoes") are filtered out and not presented to the customer 14, even though they were deemed by the outfit recommender 17 to have been acceptable recommended item options. Items 118 and 119 are filtered out based on the filter information 120 and/or profile information 130. The filter information 120 and/or profile information 130 indicates that item 116 is more likely to result in a sale than item 118. The outfit recommender 17 utilizes filter information 120 and/or profile information 130 in determining that item 117 is more likely to result in a sale than item 119. In one example, items 118 and 119 are filtered out because they are not consistent with the price range ("<$200") or designer preference ("D1, D2, D3, . . . ") set by customer 14 or determined by outfit recommender 17 to be a preference of the customer 14. In another example, items 118 and 119 are filtered out as being less likely to result in sales after considering customer behavior, consumer trends, price data, provider or source data, sales data, market trends, or other information usable to drive sales.

In one embodiment, the filter information 120 and profile information 130 are applied after the similarity analysis is performed as shown in FIGS. 5 and 6. After the recommended items are obtained, they are filtered using the filter information 120 and profile information 130 to obtain filtered complementary items 111. The filtered complementary items are presented to the customer 14. In another embodiment, the filter information 120 and profile information 130 are stored within embeddings, such as embedding information 26 and 36. The similarity analysis performed in connection with FIGS. 5 and 6 incorporates the filter and profile information 120 and 130 and yields filtered complementary items without requiring any further filtering.

Although certain specific embodiments are described above for instructional purposes, the teachings of this patent document have general applicability and are not limited to the specific embodiments described above. The outfit recommender 17 and the storage system 18 are implemented using Google® Cloud Platform (GCP), Amazon® Web Services (AWS), or Microsoft® Azure cloud services, but it is appreciated that the outfit recommender 17 and the storage system 18 may be implemented in many other ways using other platforms or techniques. Accordingly, various modifications, adaptations, and combinations of various features of the described embodiments can be practiced without departing from the scope of the invention as set forth in the claims.

What is claimed is:

1. A method comprising:
generating a plurality of pre-curated outfits, wherein each of the pre-curated outfits includes complementary items;
generating complementary item embeddings for each of the pre-curated outfits using an embedding model;
identifying taxons of each complementary item embedding;
labeling complementary item embeddings with taxon identifiers based on identified taxons;
generating embeddings for each available item physically in available inventory, wherein a provider entity sells items in available inventory via an online commerce platform;
continuously updating available item embeddings for each available item in available inventory as items are added to or removed from available inventory, wherein each available item embedding represents visual characteristics of an associated item;
continuously updating labeling of available item embeddings with taxon identifiers as items are added to or removed from available inventory;
obtaining a selected item embedding associated with a selected item in available inventory, wherein the selected item is selected via the online commerce platform, and wherein the selected item has a selected item taxon;
identifying a preconfigured item most visually similar to the selected item by comparing via cosine similarity the selected item embedding to preconfigured item embeddings with matching taxon identifiers, wherein the preconfigured item is associated with preconfigured complementary items, and wherein the preconfigured item and the associated preconfigured complementary items together represent a pre-curated outfit; and
obtaining complementary items in available inventory most visually similar to the preconfigured complementary items, wherein the complementary items are obtained by comparing via cosine similarity each of the preconfigured complementary item embeddings to available inventory item embeddings with matching taxon identifiers.

2. The method of claim 1, wherein the available inventory is stored in a storage system, wherein the preconfigured item and preconfigured complementary items are part of one of many preconfigured outfits stored in the storage system, and wherein the preconfigured outfits and the available inventory are represented as embeddings stored in the storage system.

3. The method of claim 1, further comprising:
presenting the complementary items on a product detail page (PDP) along with the selected item, wherein the PDP is dynamically updated based on changes in inventory availability of the complementary items.

4. The method of claim 1, wherein the preconfigured item and preconfigured complementary items are not required to be available in inventory to obtain the complementary items in available inventory.

5. The method of claim 1, wherein the embedding is a low-dimensional vector, wherein the embedding represents one or more of image information, item description information, taxon information, price information, provider or source information, sale information, market characteristic information, or other filter information.

6. The method of claim 1, further comprising:
filtering complementary items in available inventory based on filter information to obtain filtered complementary items; and
presenting the filtered complementary items.

7. The method of claim 6, wherein the filter is selected from the group consisting of: a price filter, a designer type filter, a time filter, a demand filter, and a preconfigurable filter.

8. A system comprising:
a storage system, wherein the storage system stores embeddings for available inventory and embeddings for preconfigured outfits; and
an outfit recommender, wherein the outfit recommender is configured to: (i) obtain an embedding associated with a selected item in available inventory, (ii) obtain a preconfigured item most visually similar to the selected item via cosine similarity comparison only with preconfigured item embeddings having matching pre-labeled taxons, wherein the preconfigured item has associated preconfigured complementary items, and (iii) obtain complementary items in available inventory most visually similar to the preconfigured complementary items via cosine similarity comparison of each preconfigured complementary item embedding only with available inventory embeddings having matching pre-labeled taxons.

9. The system of claim 8, further comprising:
a product detail page (PDP), wherein an identifier is received onto the outfit recommender in response to a user selecting to view the PDP for the selected item, and wherein the complementary items are presented on the PDP along with the selected item.

10. The system of claim 8, wherein the outfit recommender handles communication in accordance with a representational state transfer application programming interface (REST API).

11. The system of claim 8, wherein the preconfigured item and preconfigured complementary items are not required to be available in inventory to obtain the complementary items in available inventory.

12. The system of claim 8, wherein the embedding is a low-dimensional vector, wherein the embedding represents one or more of image information, taxon information, price information, provider information, sale information, or filter information.

13. A method comprising:
tracking user activity and market trends on an electronic commerce platform operated by an online consignment entity that operates a two-sided marketplace of buyers and sellers;
generating a plurality of pre-curated outfits, wherein each of the pre-curated outfits includes complementary items;

generating complementary item embeddings for each of the pre-curated outfits using an embedding model;

labeling complementary item embeddings with taxon identifiers based on identified taxons;

generating embeddings for each available item physically in available inventory;

continuously updating available item embeddings for each available item in available inventory as items are added to or removed from available inventory, wherein each available item embedding represents visual characteristics of an associated item;

continuously updating labeling of available item embeddings with taxon identifiers as items are added to or removed from available inventory;

obtaining a selected item embedding associated with a selected item in available inventory, wherein the selected item is selected via the online commerce platform, and wherein the selected item has a selected item taxon;

identifying a preconfigured item most visually similar to the selected item by comparing via cosine similarity the selected item embedding to preconfigured item embeddings with matching taxon identifiers, wherein the preconfigured item is associated with preconfigured complementary items, and wherein the preconfigured item and the associated preconfigured complementary items together represent a pre-curated outfit;

obtaining complementary items in available inventory most visually similar to the preconfigured complementary items, wherein the complementary items are obtained by comparing via cosine similarity each of the preconfigured complementary item embeddings to available inventory item embeddings with matching taxon identifiers; and filtering the complementary items based on tracked user activity and market trends.

14. The method of claim 13, further comprising:

presenting filtered complementary items to a user of the electronic commerce platform.

* * * * *